United States Patent [19]

Mima

[11] 3,721,753

[45] March 20, 1973

[54] COLOR TELEVISION RECEIVER

[75] Inventor: Koichiro Mima, Kanagawa-ken, Japan

[73] Assignee: Sony Corporation, Tokyo, Japan

[22] Filed: Oct. 22, 1971

[21] Appl. No.: 191,764

[30] Foreign Application Priority Data

Oct. 26, 1970 Japan ....................45/94188
April 13, 1971 Japan ....................46/23299

[52] U.S. Cl.....................178/5.4 P, 178/5.4 SD
[51] Int. Cl.....................H04n 9/02
[58] Field of Search........178/5.4, 5.4 P, 5.4 S, 5.4 C, 178/5.4 CD, 5.4 SD

[56] References Cited

UNITED STATES PATENTS

| | | | |
|---|---|---|---|
| 3,449,510 | 6/1969 | Steinkopf | 178/5.4 C |
| 3,548,091 | 12/1970 | Bockwoldt | 178/5.4 CD |
| 3,597,530 | 8/1971 | Hartwich | 178/5.4 P |

*Primary Examiner*—Richard Murray
*Attorney*—Lewis H. Eslinger et al.

[57] ABSTRACT

A decoding system to receive PAL color television signals in which one line of chrominance information is applied to synchronous demodulators and the same line, delayed one line interval by means of a switching circuit and delay means, is again applied to the same demodulators. Detecting means are provided for detecting the phase of burst signals in the chrominance information applied to the demodulators. Reference subcarrier generating means connected to the demodulators are phase-controlled in response to the phase of the burst signals, and the switching circuit is controlled by the output of the detecting means in response to the phase of the burst signal so as to apply to the demodulators only the chrominance information whose suppressed carrier signal has a predetermined phase relation with the reference subcarriers.

12 Claims, 21 Drawing Figures

INVENTOR
KOICHIRO MIMA

INVENTOR
KOICHIRO MIMA

INVENTOR
KOICHIRO MIMA

INVENTOR
KOICHIRO MIMA

INVENTOR
KOICHIRO MIMA

COLOR TELEVISION RECEIVER

BACKGROUND OF THE INVENTION

1. Field of the Invention

This invention relates generally to color television receivers adapted to receive signals transmitted in accordance with the phase alternation by line system commonly referred to as the PAL system, and more particularly to a decoding system for use in the color television receivers to receive and display the signals transmitted according to the PAL system.

2. Description of the Prior Art

In the PAL system a composite color television signal includes two color signal components, usually as color difference signals, containing chrominance information. These color signal components are simultaneously encoded by suppressed-carrier quadrature amplitude modulation on a color subcarrier within the video frequency band, and the phase of the modulation axis for one of the color signal components is reversed 180° for every line period.

For decoding such a composite color television signal, there have heretofore been proposed several systems, for example the so-called simple PAL system and standard PAL system. These conventional systems, however, decode the PAL signals at the price of deteriorated quality of the reproduced picture or at the price of greatly increasing the complexity of the system.

A co-pending application, Ser. No. 90,904, filed Nov. 19, 1970, entitled COLOR TELEVISION RECEIVER, and assigned to the assignee of the present application, discloses a novel system for decoding the PAL signals in such a way as to avoid some of the limitations inherent in existing PAL decoding systems. The aforesaid novel system is also theoretically capable of receiving signals transmitted either on the PAL system or on the so-called NTSC system, although the actual color subcarrier frequencies used in these two television systems usually make it impractical to take advantage of this latter feature.

The decoding system of the co-pending application includes a switching circuit and delay means connected to receive the incoming chrominance signal. This chrominance signal is first transmitted directly to demodulators for one line interval of time, and then the same information, delayed one line interval of time by the delay means, is again transmitted through the switching circuit to the demodulators for the next line interval. The chrominance information transmitted from the television station during the second line interval is not used by the receiver. The signal transmitted during the third line interval is passed, without being delayed, to the demodulators and is repeated, in delayed form, during the fourth line interval of time. As a result, the chrominance signal, in which both modulation axes for two color signal components are held in their fixed phases during the whole line intervals, is obtained and supplied to the demodulators. For correct demodulation, it is necessary in this case that the phases of the two modulation axes of the chrominance signal supplied to the demodulators have the same phases as those of the corresponding reference subcarrier signals which are originated by a local oscillator phase controlled with a burst signal included in the composite color television signal and used for demodulating the two color signal components. To achieve this, it is necessary to detect the phases of the modulation axes of the chrominance signal and to control the switching circuit connected to receive the incoming chrominance signal so as to transmit the chrominance signal having proper modulation axes to the demodulator or to control the phase of the reference subcarrier signals from the local oscillator.

SUMMARY OF THE INVENTION

It is one of the objects of the present invention to provide an improvement in the decoding system of the aforesaid application, Ser. No. 90,904.

Another object of this invention is to provide a decoding system for the PAL signal in which the chrominance signal supplied to a demodulator will automatically be selected to be one having modulation axes of proper phase in connection with the reference subcarrier signals for demodulation.

A further object of this invention is to provide a decoding system for the PAL signal in which the chrominance signal having modulation axes of proper phase in relation to the reference subcarrier signal for demodulation will be selected in response to the phase of the burst signal in the chrominance signal transmitted to a demodulator.

Still further objects of this invention will be apparent from the following specification together with the drawings.

DESCRIPTION OF THE PREFERRED EMBODIMENTS

Figure 1:
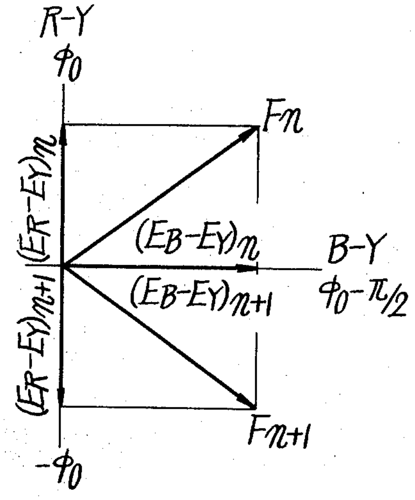
FIGS. 1 and 2 are vector diagrams for explaining the PAL signal.

The essence of the PAL color television system is in the phase relationship between the two color difference signals modulated on a common subcarrier to form a chrominance signal. This phase relationship is shown in FIG. 1. One of the chrominance components, $E_B$–$E_Y$, contains information concerning blue components of the television image. The other, $E_R$–$E_Y$, contains information relating to red components. Both of these chrominance components are modulated on the same carrier, or more properly the same subcarrier, but the modulation is performed separately and in such a way that for a given interval of time corresponding to one line $n$ of the color television image, the chrominance component $E_R$–$E_Y$ is modulated on the carrier with a modulation axis having a phase $\phi_0$. During the same interval of time the other chrominance component $E_B-E_Y$ is modulated on the carrier with a modulation axis having a phase $\phi_0 - \pi 12$. It is for this reason that the chrominance component $(E_B-E_Y)_n$ representing blue information during the given line interval $n$ is represented as a horizontal arrow and the red chrominance component $(E_R-E_Y)_n$ during the same line interval $n$ is represented by an arrow pointing vertically upward. Vector addition of these two chrominance components produces a resultant signal $F_n$, which is a complex voltage which can be defined by the expression $(E_B-E_Y)_n + j(E_R-E_Y)_n$.

The phase relationship for the following line $n+1$ is also represented in FIG. 1. In this case, the chrominance component $E_B-E_Y$ is modulated on the carrier with the modulation axis having the same phase $\phi_0 - \pi/2$ as in the previous line. Accordingly, the chrominance component $(E_B-E_Y)_{n+1}$ for the line $n+1$ is represented in the same direction as the component $(E_B-E_{YB}')_n$. However, in accordance with the PAL system the chrominance component $E_R-E_Y$ is modulated on the carrier with a modulation axis having a phase $\phi-\pi$, which is the same as $K-\zeta_0$, and is reversed from the phase characterized in the preceding line $n$. Therefore, the chrominance component $(E_R-E_Y)_{n+1}$ for the line $n+1$ is represented in the direction opposite to the component $(E_R-E_Y)_n$. Thus, the signal E $_{n+}$1 can be defined by the expression $(E_B-E_Y)_{n+1} - j(E_R-E_y)_{n+1}$.

Figure 2:
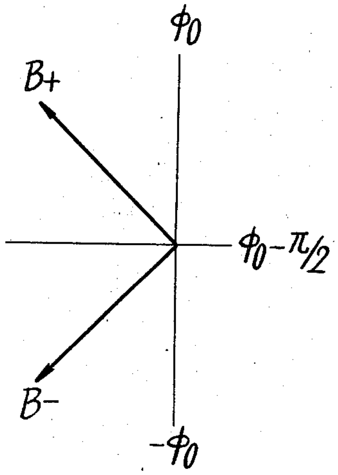

The chrominance signal includes a burst signal (a color synchronizing signal). The burst signal takes different phases in both signals $F_n$ and $F_{n+1}$, respectively. That is, as shown in FIG. 2, the phase of the burst signal in the signal $F_n$ is advanced counterclockwise by 45° from the phase $\phi_0$, and is represented as B+, and the phase of the burst signal in the signal $F_{n+1}$ is retarded clockwise by 45° from the phase $\phi_0-\pi$, and is represented as B−.

Figure 3:
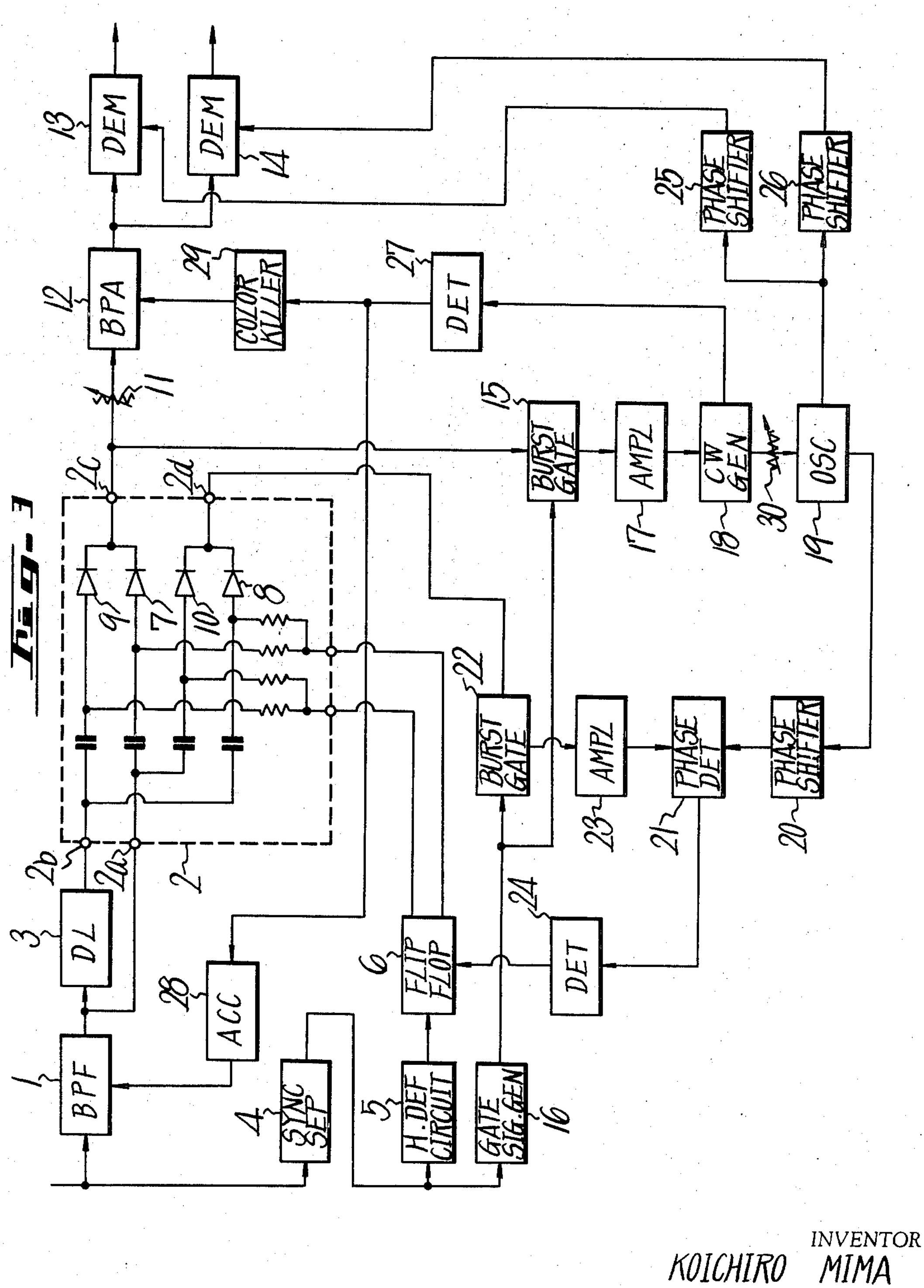
FIG. 3 is a block diagram showing one example of this invention.

FIG. 3 illustrates one example of the decoding system according to the present invention. Reference numeral 1 indicates a bandpass amplifier by which the aforementioned chrominance signal is separated from the composite color television signal. The chrominance signal is supplied directly to one input terminal 2a of a switching circuit 2, which is electrically equivalent to a double-pole-double-throw switch. At the same time, the signal from the filter 1 is applied to the other input terminal 2b of the circuit 2 through a delay circuit 3 by which the signal is delayed for one line interval.

The composite television signal is also applied to a synchronizing signal separator circuit 4, which separates the horizontal synchronizing signal. This signal is then applied to a horizontal deflection circuit 5 to provide a series of pulses having the horizontal repetition rate. These pulses are applied to a flip-flop circuit 6 to actuate it. The resulting square wave output signal from the flip-flop circuit 6 is connected to the switching circuit 2 to cause the switching circuit to change over at the end of every horizontal scanning line in such a manner that diodes 7 and 8 are turned on at the arrival of a line (hereinafter referred to as a plus line) in which the demodulation axis for the red color difference signal has a phase $\phi_0$. Conversely, diodes 9 and 10 are turned on at the arrival of a line (hereinafter referred to as a minus line) in which the modulation axis for the red color difference signal has a phase $-\phi_0$. When the switching circuit 2 is changed over in the above manner, only plus line signals are sequentially derived, twice each, from the output terminal 2c in the order: . . . $F_n, F_n, F_{n+2}, F_{n+2}, F_{n+4}, \ldots$, and no minus line signals are derived therefrom. Conversely, only minus line signals are sequentially derived, twice each, from the other output terminal 2d in the order: . . . $F_{n-1}, F_{n+1}, F_{n+1}, F_{n+3}, F_{n+3}, \ldots$, and no plus line signals are derived therefrom. Then the signal from one of the output terminals, for example the terminal 2c, is applied to demodulators 13 and 14 through a hue controller 11 and a bandpass filter or amplifier 12. Accordingly, the demodulators 13 and 14 are supplied with a train of the plus line signals in the order: . . . $F_n, F_n, F_{n+2}, F_{n+2}, \ldots$, so that, by supplying the demodulators 13 and 14 with reference subcarrier signals having phases $\phi_0$ and $\phi_0 - \pi/2$, respectively, the demodulator 13 derives a train of demodulated chrominance components in the following order: . . . $(R-Y)_n, (R-Y)_n, (R-Y)_{n+2}, (R-Y)_{n+2}, \ldots$, and the demodulator 14 derives a train of demodulated chrominance components in the following order: . . . $(B-Y)_n, (B-Y)_n, (B-Y)_{n+2}, (B-Y)_{n+2}, \ldots$ Conversely, if the switching circuit 2 is altered to the condition opposite to the above one, only the minus line signals are derived from the output terminal 2c in the order: . . . $F_{n-1}, F_{n+1}, F_{n+1}, F_{n+3}, F_{n+3}, \ldots$, and no plus line signals are derived therefrom. Conversely, only plus line signals are derived from the other output terminal 2d in the order: . . . $F_n, F_n, F_{n+2}, F_{n+2}, F_{n+4}, \ldots$, and no minus line signals are derived therefrom. Accordingly, in this case the demodulated output will only be correct if a reference subcarrier signal having a phase $-\phi_0$ is applied to the demodulator 13. To achieve this, the flip-flop circuit 6 is controlled in such a manner as to put the switching circuit 2 in its correct changed-over condition at all times, that is, in the condition in which the plus line signals are derived from the output terminal, for example the terminal 2c, and the minus line signals are derived from the other output terminal 2d, whereby the reference subcarrier signal having the phase $\phi_0$ is always applied to the demodulator 13 to ensure demodulation of a predetermined chrominance component.

Figure 4A:
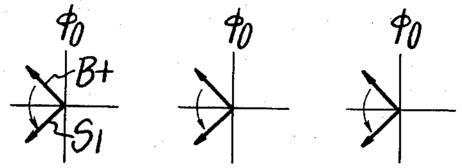
FIGS. 4A–4C and 5A–5C are vector diagrams for explaining the example of FIG. 3.
Figure 5A:
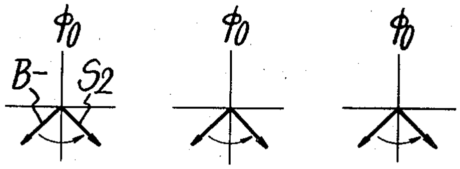
Figure 4B:
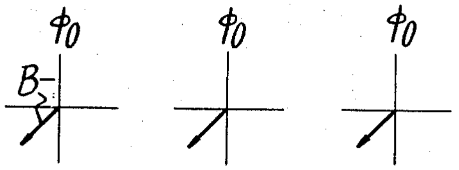
Figure 5B:
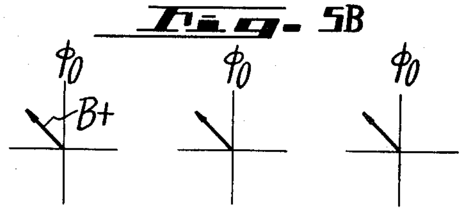
Figure 4C:
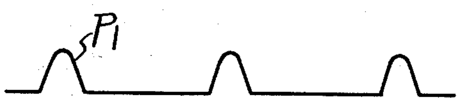
Figure 5C:
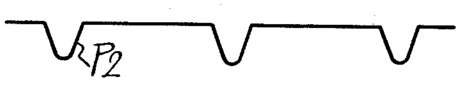

The control of the flip-flop circuit 6 is achieved based on a signal produced by phase comparison of burst signals contained in the chrominance signals derived from the output terminals 2c and 2d of the switching circuit 2. That is, the signal from the one output terminal 2c of the switching circuit 2 is supplied to a burst gate circuit 15 to extract therefrom a burst signal by means of a gate signal which is produced by supplying the horizontal synchronizing signal from the synchronizing signal separating circuit 4 to a gate signal generator circuit 16. The burst signal thus obtained from the circuit 15 is applied through an amplifier 17 to a continuous wave generator circuit 18 to derive a continuous wave signal therefrom. This continuous wave signal is fed to a local oscillator 19 to provide a reference signal of the same phase as the burst signal, and the reference signal is fed to a phase detecting circuit 21 through a 90° phase shifter 20. On the other hand, the signal from the other output terminal 2d of the switching circuit 2 is supplied to a burst gate circuit 22 to extract therefrom a burst signal with a gate signal derived from the gate signal generator circuit 16, and the burst signal thus obtained is applied to the phase detecting circuit 21 through an amplifier 23. In the event that the operation of the switching circuit 2 is correctly timed to derive the plus and minus line signals from the output terminals 2*c* and 2*d*, respectively, the burst gate circuit 15 derives a burst signal B+ of a phase advanced by 45° relative to the axis $\phi_0$ as shown in FIG. 4A, and accordingly, a reference signal of the same phase as that of the burst is derived from the local oscillator 19, while the phase shifter 20 produces a reference signal $S_1$ of a phase delayed by 45° relative to the axis $-\phi_0$ as depicted in FIG. 4A, and the reference signal $S_1$ is applied as one input to the phase detecting circuit 21. Further, a burst signal B−, such as shown in FIG. 4B, which has a phase delayed by 45° relative to the axis $-\phi_0$, is always derived from the burst gate circuit 22 and applied as the other input to the phase detecting circuit 21. Consequently, a positive pulse signal $P_1$, such as depicted in FIG. 4C, is derived from the phase detecting circuit 21. Conversely, in the event that the switching circuit 2 is incorrectly changed over to derive minus and plus line signals from the output terminals 2*c* and 2*d*, respectively, a burst signal B−, such as is shown in FIG. 5A, which has a phase delayed by 45° relative to the axis $-\phi_0$, is always derived from the burst gate circuit 15, and a reference signal of the same phase as that of the burst signal B− is obtained from the local oscillator 19 and a reference signal $S_2$ of a phase advanced by 45° relative to the axis $-\phi_0$, as shown in FIG. 5A, is derived from the phase shifter 20 and applied as one input to the phase detecting circuit 21. Further, a burst signal B+, such as depicted in FIG. 5B, which has a phase advanced by 45° relative to the axis $\phi_0$, is always derived from the burst gate circuit 22 and applied as the other input to the phase detecting circuit 21. Accordingly, a negative pulse $P_2$, such as shown in FIG. 5C, is derived from the phase detecting circuit 21 at the arrival of the burst signal. That is, the phase detecting circuit 21 produces a signal whose polarity is dependent upon whether the switching circuit 2 is changed over correctly or incorrectly. The signal from the phase detecting circuit 21 is applied to a detecting circuit 24 to control the flip-flop circuit 6 with its output in such a manner as to reverse it when the negative pulse signal $P_2$ is derived from the phase detecting circuit 21. Accordingly, even if the switching circuit 2 starts off with the wrong pair of diodes conductive or, for some reason, momentarily shifts so that the wrong pair becomes conductive, it is immediately returned to its correct condition, so that the plus line signals . . . $F_n$, $F_n$, $F_{n+2}$, $F_{n+2}$, $F_{n+4}$, . . . are always supplied to the demodulators 13 and 14. Since the switching circuit 2 is, therefore, virtually always correct, the local oscillator 19 derives a reference signal of a phase advanced by 45° relative to the axis $\phi_0$ at all times. This reference signal is applied to a phase shifter 25 to be delayed by 45° to provide a reference subcarrier signal of a phase $\phi_0$, which is fed to the demodulator 13. Further, the signal from the local oscillator 19 is supplied to a phase shifter 26 to be delayed so as to provide a reference subcarrier signal of a phase $\phi_0 - \pi/2$, which is applied to the demodulator 14. In this manner, predetermined outputs are always derived from the demodulators 13 and 14.

The signal from the continuous wave signal generator circuit 18, which is in phase with the burst signal in the plus line signal, is applied to a detector circuit 27, the detected output from which is applied through an automatic color controller 28 to the bandpass amplifier 1 to control its gain in accordance with the value of the detected output, thereby achieving color saturation control. Further, the detected output from the detector circuit 27 is supplied to a color killer circuit 29, which is connected to the bandpass amplifier 12 to make this amplifier non-conductive during reception of monochrome television signals, thereby achieving color killing operation. Further, a hue controller 30 is provided, for example, between the continuous wave generator circuit 18 and the local oscillator 19 by means of which the phase of the reference signal from the local oscillator 19 is adjusted to control the hue.

In the foregoing example, exactly the same operations can be accomplished even by applying the signal from the local oscillator 19, as it is, to the phase detecting circuit 21 and applying the burst signal from the amplifier 23 to the phase detecting circuit 21 through, for example, a phase shifter capable of delaying the phase of the burst signal by 90°.

Figure 6:
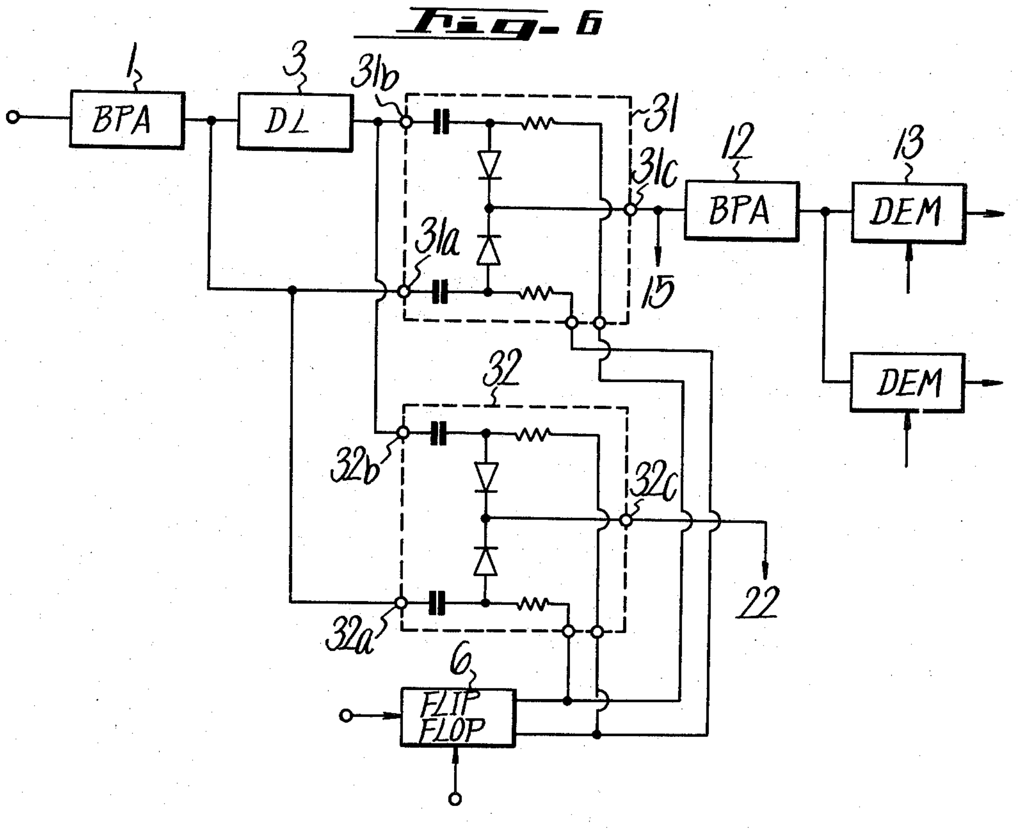
FIG. 6 is a block diagram illustrating another example of this invention.

The example shown in FIG. 6 employs two switching circuits 31 and 32, each having one output terminal, in place of the switching circuit 2 shown in FIG. 3 and commonly referred to as a double-pole-double-throw switch. In FIG. 6, the chrominance signal separated by the bandpass amplifier 1 is applied as it is to input terminals 31*a* and 32*a* of the switching circuits 31 and 32 and to the delay circuit 3 that delays the signal for one horizontal line period. The output of the delay circuit is connected to the other input terminals 31*b* and 32*b* of the switching circuits. The switching circuits 31 and 32 are alternately changed over by the signal from the flip-flop circuit 6 to derive, at an output terminal 31*c* of the switching circuit 31, the plus line signals in the following order: . . . $F_n$, $F_n$, $F_{n+2}$, $F_{n+2}$, $F_{n+4}$, . . . and, at an output terminal 32*c* of the other switching circuit 32, the minus line signals in the following order: . . . $F_{n-1}$, $F_{n+1}$, $F_{n+1}$, $F_{n+3}$, $F_{n+3}$, . . . Accordingly, the signal derived from the output terminal 31*c* of the switching circuit 31 is fed to the demodulators 13 and 14, and the flip-flop circuit 6 is controlled based on a phase comparison signal produced by the phase comparison of the burst signals contained in the signals from the output terminals 31*c* and 32 *c* of both switching circuits 31 and 32, so that exactly the same operations as those in the example of FIG. 3 can be achieved.

It is also possible to supply the minus line signal from the output terminal 2*d* of the switching circuit 2 in FIG. 3 or the output terminal 32*c* of the switching circuit 32 in FIG. 6 to the demodulators 13 and 14, respectively, and the reference subcarrier signals of the phases $-\phi_0$ and $\phi_0 - \pi/2$ to the demodulators 13 and 14, respectively, so as to derive from the demodulators 13 and 14 demodulated chrominance components in the following orders: . . . $(R-Y)_{n-1}$, $(R-Y)_{n+1}$, $(R-Y)_{n+1}$, $(R-Y)_{n+3}$ $(R-Y)_{n+3}$ . . . and $(B-Y)_{n-1}$ $(B-Y)_{n-1}$ $(B-Y)_{n+1}$ $(B-Y)_{n+1}$ $(B-Y)_{n+3}$ . . ., respectively.

Further, it is also possible to apply the plus line signal from the output terminal 2*c* or 31*c* of the switching circuit 2 or 31 to the demodulator 13, for example, and the minus line signal from the output terminal 2*d* or 32*c* of the switching circuit 2 or 32 to the demodulator 14.

Figure 11:
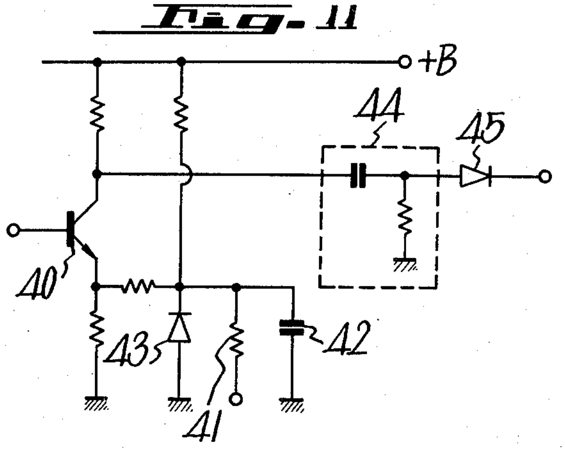
FIG. 11 is a connection diagram of one portion of the example of FIG. 7.
Figure 7:
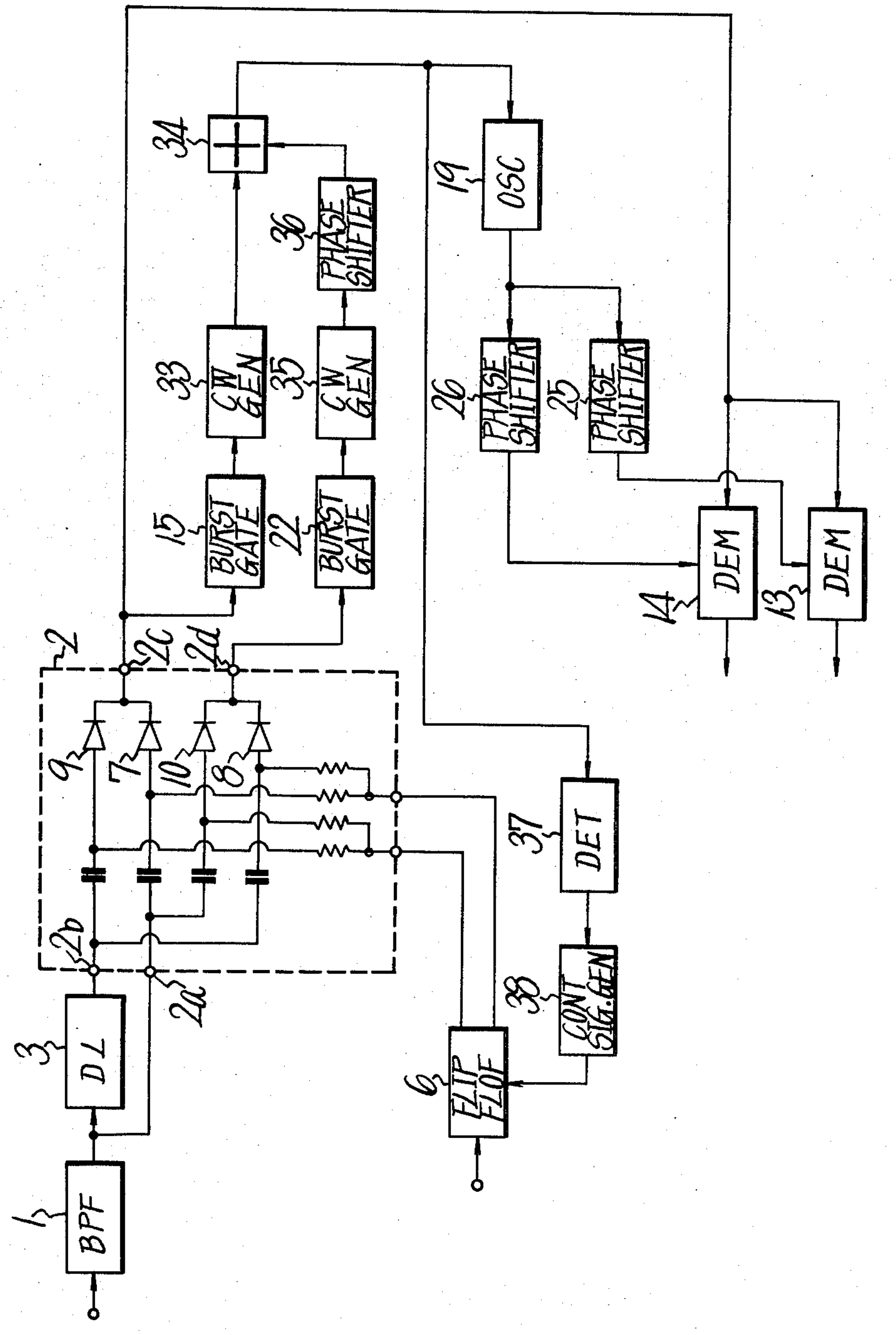
FIG. 7 is a block diagram showing still another example of this invention.

FIG. 7 illustrates another example of this invention in which the signal that controls the switching circuit 2 is not produced by phase comparison of the burst signals contained in the two output chrominance signals derived from the switching circuit 2 but is produced by adding together the two burst signals or signals based thereon. In order to accomplish this, a first signal from the output terminal 2*c* of the switching circuit 2 is supplied to the burst gate circuit 15 to derive a burst signal therefrom. This burst signal is applied to a continuous wave signal generator circuit 33 having a quartz oscillator and the resulting continuous wave signal derived therefrom is fed to an adding circuit 34. At the same time, a second signal from the output terminal 2*d* of the switching circuit 2 is applied to the burst gate circuit 22 to derive a burst signal therefrom. The latter burst signal is fed to a continuous wave signal generator circuit 35, which is like the circuit 33, and a continuous wave signal therefrom is applied to the adding circuit 34 through a phase shifter 36 that delays the phase of the continuous wave signal 90°. The output from the adding circuit 34 is supplied to a detecting circuit 37 and the detected output signal is applied to a control signal generator circuit 38. The output from the control signal generator circuit 38 is applied to the flip-flop circuit 6 to control the switching circuit 2. The detecting circuit 37 has a characteristic of the type indicated by a curve 39 in FIG. 8 in which the output voltage increases with a decrease in the amplitude of the input signal. That is, the output voltage from the detecting circuit 37 increases with a decrease in the amplitude of the signal from the adding circuit 34. The control signal generator circuit 38 is adapted to produce an output when supplied with the output from the detecting circuit 37. For example, as shown in FIG. 11, the control signal generator circuit 38 includes a transistor 40, the base of which is supplied with the detected output from the detecting circuit 37 and the emitter of which is supplied with a signal which is produced by shaping a horizontal pulse with a shaping circuit consisting of a resistor 41 and a capacitor 42 and is then clamped by a diode 43 at a predetermined level. The output from the collector of the transistor 40 is differentiated by a differentiating circuit 44 and its differentiated output is supplied through a diode 45 to the flip-flop circuit 6 in FIG. 7 for changing over the switching circuit 2.

The local oscillator 19 is driven with the output of the adding circuit 34 to derive a reference signal which is supplied to the demodulator 13 after being delayed 45° in phase by a phase shifter 25 and, at the same time, to the demodulator 14 after being delayed 135° in phase by a phase shifter 26.

Figure 8:
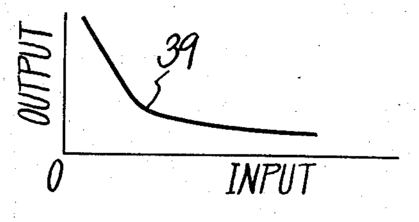
FIG. 8 is a diagram for explaining the example of FIG. 7.
Figure 9A:
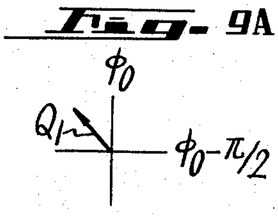
FIGS. 9A–9D and 10A–10D are vector diagrams for explaining the example of FIG. 7.
Figure 9B:
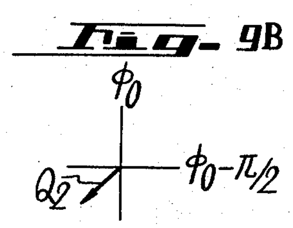
Figure 9C:
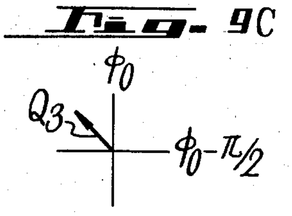
Figure 9D:
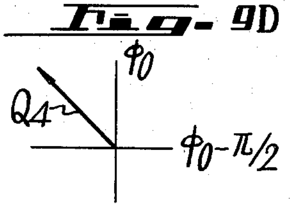

If the switching circuit 2 is in its proper switching condition in which the first signal from the output terminal 2*c* is a plus line signal and is applied to the demodulators 13 and 14, and the second signal from the other output terminal 2*d* is a minus line signal, the burst gate circuit 15 derives a burst signal B+ contained in the plus line signal and the continuous wave signal generator circuit 33 derives a continuous wave signal $Q_1$ having a phase as shown in FIG. 9A. At the same time, the burst gate circuit 22 derives a burst signal B− contained in the minus line signal and the continuous wave signal generator circuit 35 derives a continuous wave signal $Q_2$ having a phase as depicted in FIG. 9B. Consequently, the phase shifter 36 derives a continuous wave signal $Q_3$ having a phase shown in FIG. 9C, which is delayed by 90° relative to that of the signal $Q_2$ and is therefore of the same phase as the signal $Q_1$. Accordingly, the signals $Q_1$ and $Q_3$ that have the same phase are added together in the adding circuit 34, and, if the signals $Q_1$ and $Q_3$ are equal in amplitude to each other, the adding circuit 34 provides a continuous wave signal $Q_4$ shown in FIG. 9D, which has the same phase as the signals $Q_1$ and $Q_3$ and has an amplitude equal to the combined amplitudes of the signals $Q_1$ and $Q_3$. Accordingly, an increase in the amplitude of the output from the adding circuit 34 causes a decrease in the output voltage derived from the detecting circuit 37, as depicted in FIG. 8, so that no output signal is derived from the control signal generator circuit 38. Therefore, the flipping of the flip-flop circuit 6 remains unchanged and the switching circuit 2 remains in its proper switching condition.

In this case, the local oscillator 19 is driven by the continuous wave signal $Q_4$ of large amplitude which is advanced 45° in phase relative to the axis $\phi_0$, and a reference signal of the same phase as the signal $Q_4$ is derived from the local oscillator 19 and applied to the phase shifters 25 and 26. The phase shifter 25 produces one reference subcarrier signal, which has a phase aligned with the axis $\phi_0$, and is applied to the demodulator 13. The phase shifter 26 produces another reference subcarrier signal, which has a phase aligned with the axis $\phi_0 - \pi/2$ and is supplied to the demodulator 14. As a result of this, the plus line signals sequentially applied to the demodulators 13 and 14 as above described are thereby demodulated with the locally generated signals having the correct axes to provide predetermined demodulated chrominance components.

Figure 10A:
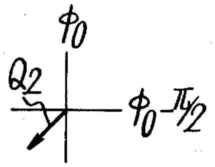
Figure 10B:
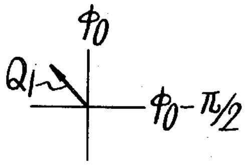
Figure 10C:
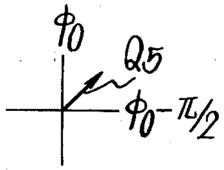
Figure 10D:
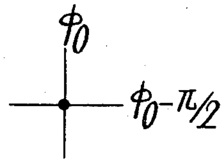

If the switching circuit 2 is altered to its opposite switching condition in which a minus line signal is derived as the first signal from the output terminal 2*c* and applied to the demodulators 13 and 14 and a plus line signal is derived as the second signal from the other output terminal 2*d*, the continuous wave signal generator circuit 33 derives a continuous wave signal $Q_2$, such as shown in FIG. 10A, which is of the same phase as that of the burst signal B− contained in the minus line signal. At the same time, the continuous wave signal generator circuit 35 derives a continuous wave signal $Q_1$, such as depicted in FIG. 10B, which is of the same phase as that of the burst signal B+ contained in the plus line signal. As a result, the phase shifter 36 provides a continuous wave signal $Q_5$, such as shown in FIG. 10C, which is delayed 90° in phase behind the signal $Q_1$ and is displaced 180° apart in phase from the signal $Q_2$. Accordingly, the signals $Q_2$ and $Q_5$ phased 180° apart from each other are added together in the adding circuit 34, and if the signals $Q_2$ and $Q_5$ are equal in amplitude to each other, the amplitude of the output from the adding circuit 34 is zero as shown in FIG. 10D. Consequently, the output voltage from the detecting circuit 37 relatively increases as will be seen from FIG. 8, so that a control signal is derived from the control signal generator circuit 38 and applied to the flip-flop circuit 6 to reverse it to its proper switching condition. Thus, the switching circuit 2 is immediately returned to its proper switching condition.

In a short period of time during which the switching circuit 2 remains in its improper switching condition, the amplitude of the output from the adding circuit 34 is zero, so that the local oscillator 19 is not driven.

With the present invention above described, the flip-flop circuit for changing over the switching circuit is controlled on the basis of the phase of the burst signal contained in the signal from each output terminal of the switching circuit, so that predetermined demodulated chrominance components can be always obtained without fail. Further, this invention is applicable to the system in which the two chrominance signal components are I and Q signals or the like.

What is claimed is:

1. A decoding system for chrominance signal components of a color television signal transmitted in accordance with a phase alternation by line system, said decoding system comprising:

A. First circuit means comprising:

1. delay means for delaying said chrominance signal components for substantially one line period, and 2. switch means operative to change the condition thereof at every line period, said circuit means producing first and second sets of modified chrominance signals, each of said sets being composed of the delayed and non-delayed chrominance signal components arranged in sequence alternately every line period;

B. First and second demodulator means for demodulating at least one of said sets of modified chrominance signals;

C. Means for extracting burst signals from said first and second sets of modified chrominance signals, respectively;

D. Second circuit means supplied with said burst signals to produce a control signal in response to the phase of said burst signals; and E. Controlling means for controlling said switch means in said first circuit means in accordance with said control signal.

2. A decoding system according to claim 1 in which said switch means comprises:

A. A switching circuit changed over at every line period so that the sequence of said delayed and non-delayed chrominance signal components in said first set of modified chrominance signals is reversed with respect to the sequence in said second set of modified chrominance signals; and B. An actuating circuit operating said switching circuit.

3. A decoding system according to claim 2 in which said switching circuit comprises:

A. At least two input terminals supplied with the delayed and non-delayed chrominance signal components, respectively; and B. At least two output terminals deriving said first and second sets of modified chrominance signals, respectively.

4. A decoding system according to claim 2 in which said actuating circuit is connected to said controlling means to be controlled in accordance with said control signal.

5. A decoding system according to claim 4 in which said actuating circuit comprises a flip-flop circuit connected to said switching circuit.

6. A decoding system according to claim 5 in which said phase-comparing circuit comprises:

A. A local oscillator connected to said means for extracting burst signals to be controlled in response to one of said burst signals;

B. A phase shifter for phase-shifting the output from said local oscillator relative to the other of said burst signals by a predetermined phase angle; and C. A phase detector connected to said phase shifter for detecting the phase relationship between said other of the burst signals and the output from said local oscillator.

7. A decoding system according to claim 5 in which said phase-comparing circuit comprises:

A. A local oscillator connected to said means for extracting burst signals to be controlled in response to one of said burst signals;

B. A phase shifter connected to said oscillator for phase-shifting the output therefrom relative to the other of said burst signals by a predetermined phase angle; and C. A phase detector connected to said phase shifter for detecting the phase relationship between said other of the burst signals and the output from said local oscillator.

8. A decoding system according to claim 1 in which said second circuit means has a phase-comparing circuit comparing the phases of the burst signals extracted from said first and second sets of modified chrominance signals, said phase-comparing circuit producing said control signal as an output signal.

9. A decoding system according to claim 8 in which means is provided for supplying the output of said local oscillator to said first and second demodulator means.

10. A decoding system according to claim 1 in which said second circuit means comprises:

A. A phase shifter for phase-shifting at least one of the burst signals extracted from said first and second modified chrominance signals by a predetermined phase angle; and B. An adding circuit for adding said burst signals, at least one of which is phase-shifted, and the output of said adding circuit is formed into said control signal.

11. A decoding circuit according to claim 10 in which said second circuit further comprises:

A. A local oscillator controlled in response to the output of said adding circuit; and B. Means for supplying the output of said local oscillator to said first and second demodulator means.

12. A decoding system according to claim 11 in which said second circuit further comprises means for making continuous wave signals from said burst signals respectively before said adding circuit.

* * * * *